(12) United States Patent
Rosenberg et al.

(10) Patent No.: US 10,594,625 B2
(45) Date of Patent: Mar. 17, 2020

(54) MANAGING PHYSICAL RESOURCES FOR VIRTUAL NETWORK FUNCTIONS

(71) Applicant: AT&T Intellectual Property I, L.P., Atlanta, GA (US)

(72) Inventors: Eric Rosenberg, Lincroft, NJ (US); Yetik Serbest, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 568 days.

(21) Appl. No.: 15/363,511

(22) Filed: Nov. 29, 2016

(65) Prior Publication Data

US 2018/0152507 A1 May 31, 2018

(51) Int. Cl.
*G06F 15/177* (2006.01)
*H04L 12/911* (2013.01)
*H04L 12/24* (2006.01)
*H04L 12/927* (2013.01)
*H04L 29/08* (2006.01)

(52) U.S. Cl.
CPC ........ *H04L 47/822* (2013.01); *H04L 41/0803* (2013.01); *H04L 41/0823* (2013.01); *H04L 41/0853* (2013.01); *H04L 47/781* (2013.01); *H04L 47/803* (2013.01); *H04L 67/10* (2013.01)

(58) Field of Classification Search
CPC . H04L 67/1008; H04L 67/1097; H04L 67/22; H04L 67/38; H04L 41/0803; H04L 41/0893; H04L 41/5096; H04L 43/0817; H04L 43/16; H04L 47/10; H04L 47/12; H04L 47/822

USPC ......................................... 709/220, 224, 226
See application file for complete search history.

(56) References Cited

U.S. PATENT DOCUMENTS

| | | | |
|---|---|---|---|
| 9,276,877 B1 | 3/2016 | Chua et al. | |
| 9,298,515 B2 | 3/2016 | McMurry et al. | |
| 9,369,390 B2 | 6/2016 | Bantukul et al. | |
| 2010/0050172 A1* | 2/2010 | Ferris | G06F 9/4856 718/1 |
| 2013/0080619 A1* | 3/2013 | Assuncao | G06F 9/45558 709/224 |
| 2013/0226922 A1* | 8/2013 | Labenski | G06F 16/35 707/737 |
| 2014/0201374 A1* | 7/2014 | Ashwood-Smith | H04L 49/70 709/226 |
| 2014/0229945 A1 | 8/2014 | Barkai et al. | |
| 2014/0317261 A1 | 10/2014 | Shatzkamer et al. | |
| 2015/0124622 A1 | 5/2015 | Kovvali et al. | |
| 2015/0169340 A1 | 6/2015 | Haddad et al. | |

(Continued)

OTHER PUBLICATIONS

"ECOMP (Enhanced Control, Orchestration, Management & Policy) Architecture White Paper"; Article; AT&T Inc.; © 2016; 31 pages.

(Continued)

*Primary Examiner* — Farzana B Huq
(74) *Attorney, Agent, or Firm* — BakerHostetler

(57) ABSTRACT

A method includes receiving profile information for a network. The method also includes determining a network configuration based on at least a constraint associated with at least one of a network session or a hardware capacity of a hardware platform of the network and a number of sessions that the network configured based on the network configuration can support. The method also includes configuring the network based on the network configuration.

14 Claims, 9 Drawing Sheets

(56) References Cited

U.S. PATENT DOCUMENTS

| | | | |
|---|---|---|---|
| 2015/0286492 A1* | 10/2015 | Breitgand | G06F 9/45558 |
| | | | 718/1 |
| 2015/0358235 A1 | 12/2015 | Zhang et al. | |
| 2016/0011894 A1 | 1/2016 | Reddy et al. | |
| 2016/0057234 A1 | 2/2016 | Parikh et al. | |
| 2016/0150421 A1 | 5/2016 | Li et al. | |
| 2016/0212017 A1 | 7/2016 | Li et al. | |
| 2016/0226663 A1 | 8/2016 | Jones et al. | |

OTHER PUBLICATIONS

"SDN-NFV Reference Architecture"; Verizon Network Infrastructure Planning; Version 1.0; Feb. 2016; 220 pages.

* cited by examiner

MANAGING PHYSICAL RESOURCES FOR VIRTUAL NETWORK FUNCTIONS

TECHNICAL FIELD

This disclosure relates generally to network management and, more specifically, to network design and capacity planning.

BACKGROUND

To provide a service using virtualized network platforms, a set of virtual network functions (VNFs) may be instantiated on general purpose hardware. Each VNF may require one or more virtual machines (VMs) to be instantiated. In turn, VMs may require various resources, such as memory, virtual computer processing units (vCPUs), and network interfaces or network interface cards (NICs). Determining how to assign these resources among VMs in an efficient manner may be unbearably complex.

This disclosure is directed to solving one or more of the problems in the existing technology.

SUMMARY

In an aspect, a method may include receiving profile information for a network. The method may also include determining a network configuration based on at least a constraint associated with at least one of a network session or a hardware capacity of a hardware platform of the network and a number of sessions that the network configured based on the network configuration can support. The method may also include configuring the network based on the network configuration.

In another aspect, a method may include receiving profile information for a network. The method may also include determining constraints associated with at least one of a network session or a hardware capacity of a hardware platform of the network and determining configurations of the network based on the profile information and the constraints. The method may also include identifying a subset of the configurations that satisfies an anti-affinity rule associated with a virtual resource to be used to implement the network session and identifying a network configuration of the subset that supports a greater number of sessions than another configuration of the subset. The method may also include configuring the network based on the network configuration to support the greater number of sessions. The network configuration may assign at least one instantiation of a virtual machine (VM) of a first VM type for at least one instantiation of a virtual network function (VNF) of a first VNF type to at least one server of the hardware platform.

According to yet another aspect, a system may include an input/output communicatively coupled to a—network and a processor. The system may also include memory that stores instructions that may cause the processor executing the instructions to effectuate operations. The operations may include receiving, via the input/output, profile information for the network. The operations may also include determining constraints associated with at least one of a network session or a hardware capacity of a hardware platform of the network and determining configurations of the network based on the profile information and the constraints. The operations may also include identifying a subset of the configurations that satisfies an anti-affinity rule associated with a virtual resource to be used to implement the network session. The operations may also include identifying a network configuration of the subset that supports a greater number of sessions than another configuration of the subset and sending a command via the input/output to the network. The command may cause the network to be configured based on the network configuration.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
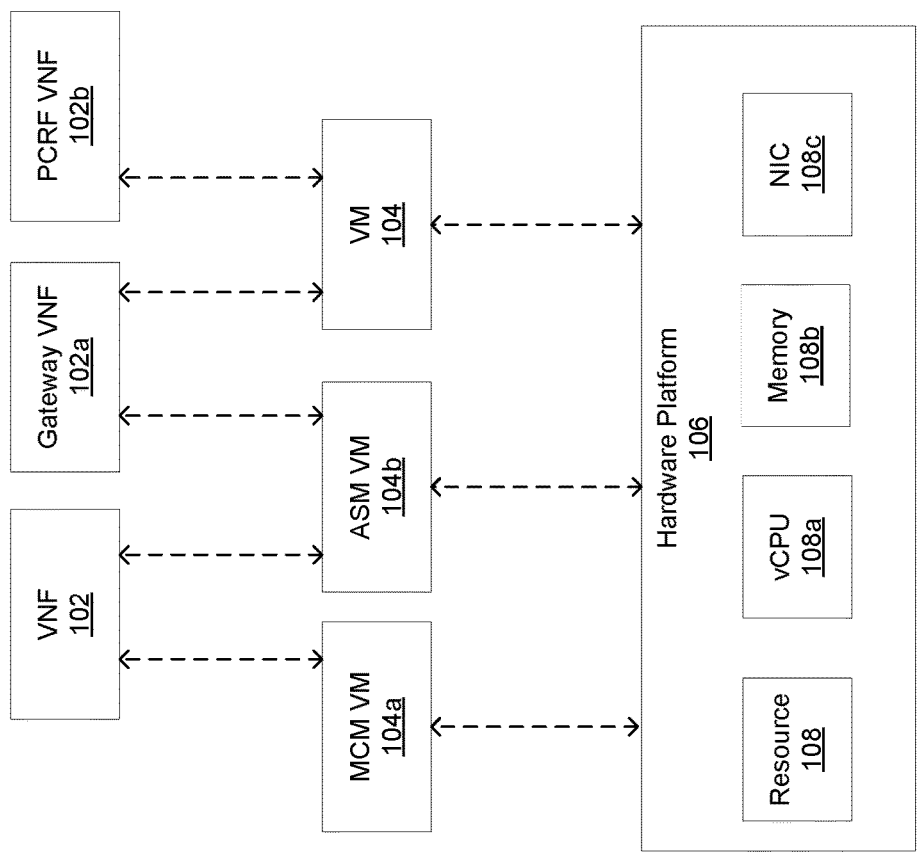
FIG. 1A is a representation of an exemplary network.

FIG. 1A is a representation of an exemplary network 100. Network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

A virtual network functions (VNFs) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs. Each VNF 102 may use one or more virtual machines (VMs) 104 to operate. Each VM 104 may have a VM type that indicates its functionality or role. For example, FIG. 1A illustrates a MCM VM 104a, an ASM VM 104b, and a DEP VM 104c. Additionally or alternatively, VMs 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
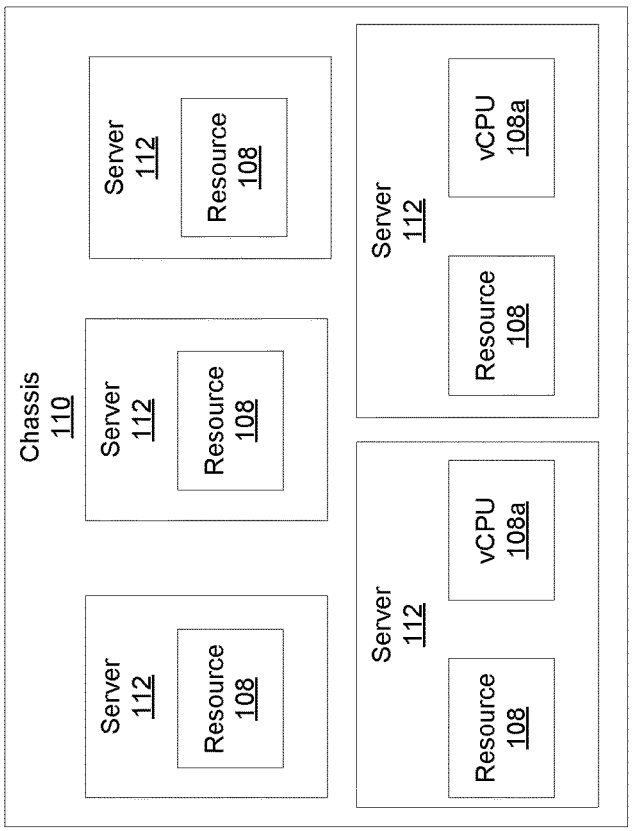
FIG. 1B is a representation of an exemplary hardware platform for a network.

While FIG. 1A illustrates resources 108 as collectively contained in hardware platform 106, the configuration of hardware platform 106 may isolate, for example, certain memory 108b from other memory 108b. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 1B illustrates that the number of servers 112 within two chasses 110 may vary. Additionally or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 106, the number of sessions that may be instantiated may vary depending upon how efficiently resources 108 are assigned to different VMs 104. For example, assignment of VMs 104 to particular resources 108 may be constrained by one or more rules. For example, these rules may include one or more affinity rules or anti-affinity rules.

An affinity rule may restrict assignment of resources 108 for a particular VM 104 (or a particular type of VM 104). For example, an affinity rule may require that certain VMs 104 be instantiated on (that is, consume resources from) the same server 112 or chassis 110. For example, an affinity rule may require that resources 108 assigned to a particular VM 104 be on the same server 112 or set of servers 112. For example, if VM 104 uses eight vCPUs 108a, one GB of memory 108b, and two NICs 108c, the rules may require that all of these resources 108 be sourced from the same server 112. For example, if VNF 102 uses six MCM VMs 104a, an affinity rule may dictate that those six MCM VMs 104a be instantiated on the same server 112 (or chassis 110). As another example, if VNF 102 uses MCM VMs 104a, ASM VMs 104b, and a third type of VMs 104, an affinity rule may dictate that at least the MCM VMs 104a and the ASM VMs 104b be instantiated on the same server 112 (or chassis 110). Affinity rules may restrict assignment of resources 108 based on the identity or type of resource 108, VNF 102, VM 104, chassis 110, server 112, or any combination thereof.

An anti-affinity rule may restrict assignment of resources 108 for a particular VM 104 (or a particular type of VM 104). In contrast to an affinity rule—which may require that certain VMs 104 be instantiated on the same server 112 or chassis 110—an anti-affinity rule requires that certain VMs 104 be instantiated on different servers 112 (or different chasses 110). For example, an anti-affinity rule may require that MCM VM 104a be instantiated on a particular server 112 that does not contain any ASM VMs 104b. As another example, an anti-affinity rule may require that MCM VMs 104a for a first VNF 102 be instantiated on a different server 112 (or chassis 110) than MCM VMs 104a for a second VNF 102. Anti-affinity rules may restrict assignment of resources 108 based on the identity or type of resource 108, VNF 102, VM 104, chassis 110, server 112, or any combination thereof.

Within these constraints, resources 108 of hardware platform 106 may be assigned to be used to instantiate VMs 104, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular hardware platform 106.

For example, consider a session that may require gateway VNF 102a and PCRF VNF 102b. Gateway VNF 102a may require five VMs 104 instantiated on the same server 112, and PCRF VNF 102b may require two VMs 104 instantiated on the same server 112. (For this example, assume that no affinity or anti-affinity rules restrict whether VMs 104 for PCRF VNF 102b may or must be instantiated on the same or different server 112 than VMs 104 for gateway VNF 102a.) In this example, each of two servers 112 may have sufficient resources 108 to support 10 VMs 104. In a first configuration, to implement sessions using these two servers 112, first server 112 may be instantiated with 10 VMs 104 to support two instantiations of gateway VNF 102a, and second server 112 may be instantiated with 9 VMs: five VMs 104 to support one instantiation of gateway VNF 102a and four VMs 104 to support two instantiations of PCRF VNF 102b. This may leave the remaining resources 108 that could have supported the tenth VM 104 on second server 112 unused (and unusable for an instantiation of either a gateway VNF 102a or a PCRF VNF 102b). Alternatively, in a second configuration, first server 112 may be instantiated with 10 VMs 104 for two instantiations of gateway VNF 102a and second server 112 may be instantiated with 10 VMs 104 for five instantiations of PCRF VNF 102b, using all available resources 108 to maximize the number of VMs 104 instantiated. By looking only at which configuration makes use of all available resources, it would appear that the second configuration would be more preferable.

Consider, further, how many sessions each gateway VNF 102a and each PCRF VNF 102b may support. These session capacities may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 104 are unused), the first configuration is actually more efficient from the perspective of being the configuration that can support more the greater number of sessions. (The second configuration supports four million sessions, while the first configuration supports six million sessions.) Since the objective goal is to maximize the number of sessions, choosing the second configuration, even though it may leave one available VM 104 unused, may actually be preferable.

To solve the problem of determining a capacity (e.g., number of sessions) that can be supported by a given hardware platform 105, a given requirement for VNFs 102 to support a session, a capacity for the number of sessions each VNF 102 (e.g., of a certain type) can support, a given requirement for VMs 104 for each VNF 102 (e.g., of a certain type), a give requirement for resources 108 to support each VM 104 (e.g., of a certain type), rules dictating the assignment of resources 108 to one or more VMs 104 (e.g., affinity and anti-affinity rules), the chasses 110 and servers 112 of hardware platform 106, and the individual resources 108 of each chassis 110 or server 112 (e.g., of a certain type), a formulation of an integer programming problem may be created.

In an aspect, the integer programming problem may be designed to maximize or minimize a linear function of one or more variables. In an aspect, an integer programming problem may be constrained by one or more inequality or equality constraints that limit the linear function. In another aspect, some or all of the variables may be integer valued. In another aspect, one or more variables may be binary.

First, a plurality of index sets may be established. For example, index set L may include the set of chasses 110. For example, if a system allows up to 6 chasses 110, this set may be:
L={1, 2, 3, 4, 5, 6},
where 1 is an element of L.

Another index set J may include the set of servers 112. For example, if a system allows up to 16 servers 112 per chassis 110, this set may be:
J={1, 2, 3, . . . , 16},
where j is an element of J.

As another example, index set K having at least one element k may include the set of VNFs 102 that may be considered. For example, this index set may include all types of VNFs 102 that may be used to instantiate a service. For example, let
K={GW, PCRF}
where GW represents gateway VNFs 102a and PCRF represents PCRF VNFs 102b.

Another index set N may include the set of possible instances of a given VNF 102. For example, if a system allows up to 10 instances of VNF 102, this set may be:
N={1, 2, 3, . . . , 10},
where n is an element of N.

Another index set I(k) may equal the set of types of VMs 104 for a VNF 102 k. Thus, let
I(GW)={MCM, ASM, IOM, WSM, CCM, DCM}
represent VMs 104 for gateway VNF 102a, where MCM represents MCM VM 104a, ASM represents ASM VM 104b, and each of IOM, WSM, CCM, and DCM represents a respective type of VM 104. Further, let
I(PCRF)={DEP, DIR, POL, SES, MAN}
represent VMs 104 for PCRF VNF 102b, where DEP represents DEP VM 104c and each of DIR, POL, SES, and MAN represent a respective type of VM 104.

There are other ways to implement the data sets, which may be used in formulations of the integer programming problem. For example, a set KI may have members that are tuples (k, i) to represent an instance and type of VNF 102. As another example, a set LJ may have members that are tuples (l, j) to represent server 112 in chassis 110.

Another index set V may include the set of possible instances of a given VM 104. For example, if a system allows up to 20 instances of VMs 104, this set may be:
V={1, 2, 3, . . . , 20},
where v is an element of V.

In addition to the sets, the integer programming problem may include additional data. The characteristics of VNFs 102, VMs 104, chasses 110, or servers 112 may be factored into the problem. This data may be referred to as parameters. For example, for given VNF 102 k, the number of sessions that VNF 102 k can support may be defined as a function S(k). In an aspect, for an element k of set K,
param S(k)>0;
is a measurement of the number of sessions k can support. Returning to the earlier example where gateway VNF 102a may support 2 million sessions, then the data may be
param S(GW)=2,000,000.

VM 104 modularity may be another parameter in the integer programming problem. VM 104 modularity may represent the VM 104 requirement for a type of VNF 102. For example, for k that is an element of set K and i that is an element of set I, each instance of VNF k may require M(k, i) instances of VMs 104. For example, recall the example where
I(GW)={MCM, ASM, IOM, WSM, CCM, DCM}.
In an example, M(GW, I(GW)) may be the set that indicates the number of each type of VM 104 that may be required to instantiate gateway VNF 102a. For example,
M(GW, I(GW))={2, 16, 4, 4, 2, 4}
may indicate that one instantiation of gateway VNF 102a may require two instantiations of MCM VMs 104a, 16 instantiations of ASM VM 104b, four instantiations of IOM VM 104, four instantiations of WSM VM 104, two instantiations of CCM VM 104, and four instantiations of DCM VM 104.

Parameters may indicate the resource requirements of a given VNF 102 or VM 104. For example, in the example hardware platform 106, resources 108 may include vCPUs 108a, memory 108b, and NICs 108c. A parameter may be used to indicate the requirements of these resources for a particular VNF 102. For example, the processing power (e.g., vCPU) requirement for each VM 104 of type i for an instance of VNF 102 of type k may be implemented as:
param Cki{K, I}>=0;
As another example, the memory requirement (e.g., measured in gigabytes) for each VM 104 of type i for an instance of VNF 102 of type k may be implemented as:
param Rki{K, I}>=0;
As yet another example, the connection requirement (e.g., measured in number of NICs 108c) for each VM 104 of type i for an instance of VNF 102 of type k may be implemented as:
param Eki{K, I}>=0;

Another parameter may indicate the capacity of hardware platform 106. For example, for each type of resource 108 there may be a parameter that indicates the amount of that type of resource. For example, a parameter Clj may indicate the processing power (e.g., measured by the number of vCPUs 108a) in one server 112 j within one chassis 110 l:
param Clj>=0;
As another example, a parameter Rlj may indicate the amount of memory (e.g., measured in gigabytes) in one server 112 j within one chassis 110 l:
param Rlj>=0;

As another example, a parameter Elj may indicate the amount of network connections (e.g., measured in number of NICS 108c) in one server 112 j within one chassis 110 l:
param Elj>=0;

With the data of the index sets and parameters, one or more variables may be defined and used for calculating the integer programming problem. For example, a binary variable X may be used to indicate whether an instance v of VM 104 of type i for an instance n of VNF 102 of type k is instantiated on server 112 j of chassis 110. This variable may be implemented as:
var X {k in K, i in I, v in V, n in N, l in L, j in J} binary;
and may equal true (or 1) if instance v of type i for instance n of type k is instantiated on j of l. Otherwise, X may equal false (or 0).

Another binary variable Y may be used to indicate whether an instance n of VNF 102 of type k has been instantiated. This variable may be implemented as:
var Y {k in K, n in N} binary;
and may equal true (or 1) if instance n of type k has been instantiated. Otherwise, Y may equal false (or 0).

The objective function, which may be the ultimate variable that the integer programming problem is designed to maximize, may be established as variable Z. Z may be implemented as:
var Z; and the objective function may be represented as:
maximize minimum_demand_feasible:
Z;
In this form, the objective function may be implemented or set up in an algebraic modeling language, such as AMPL.

However, given the complexity of the integer programming problem—the numerous variables and restrictions that must be satisfied—implementing an algorithm that may be used to solve the integer programming problem efficiently, without sacrificing optimality, may be difficult. As the examples in this disclosure suggest, there may be multiple variables, parameters, and constraints that must be considered in solving for Z. As the following explanation steps through the requirements of the calculation from a mathematical standpoint, different approaches for optimizing the implementations of such calculations are also provided.

To solve for Z, which may indicate optimized session capacity for the entire hardware platform 106, this problem may be broken down further, to the capacity for each type k of VNF 102. Thus, a variable W may indicate the capacity of type k:
var W {k in K};

And, because hardware platform 106 cannot have a greater capacity than any of the capacities of the individual types k of VNFs 102 that are used to establish sessions, then it can be stated that:

$$Z \leq W(k)$$

for any k in K.

In turn, the capacity of type k of VNFs 102 can be expressed as a formula multiplying the capacity of a single instance of VNF 102 of type k—e.g., Ck(k)—by the total number of instances n of VNFs 102 of type k. Calculating a summation of the binary variable Y for all possible instances n of type k, the total number of instances n can be $$W(k) = Ck(k) \times \sum_{n \in N} Y(k, n)$$

This constraint may be implemented as:
subject to W definition {k in K}:
W[k]=Ck[k]*sum{n in N}Y[k, n];

Thus, in the previous example where each instance of gateway VNF 102a can support 2 million sessions and each instance of PCRF gateway 102b can support 3 million sessions, if there are two instances n of each of type of VNFs 102, then:

$$W(GW) = 2{,}000{,}000 \times \sum_{n \in N} Y(GW, n) = 2{,}000{,}000 \times 2 = 4{,}000{,}000$$

$$W(PCRF) = 3{,}000{,}000 \times \sum_{n \in N} Y(PCRF, n) = 3{,}000{,}000 \times 2 = 6{,}000{,}000$$

And since Z must not be greater than any W(k), then
Z<4,000,000

For while PCRF VNFs 102b can support 2,000,000 sessions more, there are not enough gateway VNFs 102a to establish any of those additional sessions. This constraint, that Z cannot exceed the minimum W(k), may be implemented as:
subject to Z definition{k in K}:
Z<=W[k];

Another key category of constraints is that the total number of allocated resources 108 within server 112 should be less than the maximum amount of resources 108 within that server 112. That is, if server 112 only has 10 vCPUs 108a, then no more than 10 vCPUs 108a from that server 112 may be allocated. For example, the processing power allocation constraints may be represented as:

$$\sum_{k \in K} \sum_{i \in I} \sum_{v \in V} \sum_{n \in N} X(k, i, v, n, l, j) \times Cki(k, i) \leq Clj$$

Then, to implement the constraint that no more vCPUs 108a may be allocated from a given server 112 than exist in that server 112, a variable virtualCPU may be initialized to represent the total vCPUs 108a allocated to server 112 j of chassis 110 l:
var virtualCPU{l, j) in J};
Then, the equation above may be implemented as:
subject to virtualCPU{(l, j) in LJ}:
sum{k in K, i in I, v in V, n in N} X[k, i, v, n, l, j]*Cki[k, i]<=Clj;

While the above constraint may be technically and mathematically correct, computational limits of the system running the calculations may make it difficult to efficiently or timely obtain results. This may be in part based on the size of the search tree that is formed in performing such calculations. Thus, different methods may be used to express the same equation in different manners that facilitate calculation of the equation by a computer program.

One approach is to disaggregate the equations by breaking them up by type of VNF K. Thus, in a scenario where K={GW, PCRF}, the equations for confirming that no resources 108 are allocated than actually exist may include (1) calculating the total resources 108 of a given type that are allocated for gateway VNFs 102a, (2) calculating the total resources 108 of a given type that are allocated for PCRF VNFs 102b, and (3) adding the amounts calculated in (1) and (2) together, confirming that the sum of (1) and (2) does not exceed Clj.

By expressing these calculations separately, the size of the set from which certain members are selected for each calculation may be smaller than the size of calculating the full constraint on Clj would have been. For example, a set VGW may include only those instances v of VMs 104 that are implemented for gateway VNFs 102a (e.g., as opposed to instances implemented for PCRF VNFs 102b). Similarly, a set VPCRF may include only those instances v of VMs 104 that are implemented for PCRF VNFs 102b (e.g., as opposed to instances implemented for gateway VNFs 102a). For example, these sets may be implemented as:
set VGW;
set VPCRF;

Thus, the above equations (1) and (2), respectively, may be rewritten as:

$$virtualCPUgw(l, j) = \sum_{i \in I} \sum_{v \in VGW} \sum_{n \in N} X(GW, i, v, n, l, j) \times Cki(GW, i)$$

(2) the equation for allocated vCPUs 108a for PCRF VNFs 104 may be:

$$virtualCPUpcrf(l, j) = \sum_{i \in I} \sum_{v \in VPCRF} \sum_{n \in N} X(PCRF, i, v, n, l, j) \times Cki(PCRF, i)$$

And the total restriction on allocated vCPU 108a may be represented as:

virtualCPUgw(l, j)+virtualCPUpcrf(l, j)<Clj

While the equation above is equal to the originally expressed constraint:

$$\sum_{k \in K} \sum_{i \in I} \sum_{v \in V} \sum_{n \in N} X(k, i, v, n, l, j) \times Cki(k, i) \leq Clj$$

by decreasing the set over which the summations for v are calculated may result in a noticeable decrease the processing, memory, or time required to calculate the equations, particularly when the size of the sets are relatively large. That is, while the two above equations share the same mathematical complexity, they may have different computational costs—that is, the time, computing power, or memory of computing the former may be less than computing the latter.

Implementing these constraints may include establishing variables that indicate the total vCPUs 108a allocated in server 112 of chassis 110 for (1) gateway VNFs 102a and (2) PCRF VNFs 102b, respectively. For example, these may be implemented as:
var virtualCPUgw{(l, j) in LJ};
var virtualCPUpcrf{(l, j) in LJ};
where virtualCPU{(l, j) in LJ}=virtualCPUgw{(l, j) in LJ}+ virtualCPUpcrf{(l, j) in LJ}

Thus, implementing the constraints of allocating only those existing vCPUs 108a may be implemented as:
subject to GWvCPU{(l, j) in LJ}:
virtualCPUgw[l, j]=sum{(GW, i) in KI, v in VGW, n in N} X[GW, i, v, n, l, j]*Cki[GW, i];
subject to PCRFvCPU{(l, j) in LJ}:
virtualCPUpcrf[l, j]=sum{(PCRF, i) in KI, v in VPCRF, n in N} X[PCRF, i, v, n, l, j]*Cki[PCRF, i];
subject to virtualCPU{(l, j) in LJ}:
virtualCPUgw[l, j]+virtualCPUpcrf[l, j]<=Clj Thus, the allocation constraint for vCPU 108a resources is calculated as three calculations. This decreases the size of the search tree without compromising the result.

The same methods may be used for implementing constraints that other resources 108 within each server 112 of each chassis 110 are not over-allocated. For example, constraints to ensure that only memory 108b that actually exists within each server 112 j of chassis 110 is allocated may be represented by the equations:

$$virtualMemoryGW(l, j) = \sum_{i \in I} \sum_{v \in VGW} \sum_{n \in N} X(GW, i, v, n, l, j) \times Rki(GW, i)$$

$$virtualMemoryPCRF(l, j) =$$
$$\sum_{i \in I} \sum_{v \in VPCRF} \sum_{n \in N} X(PCRF, i, v, n, l, j) \times Rki(PCRF, i)$$

And the total restriction on allocated memory 108b may be represented as:

virtualMemoryGW(l, j)+virtualMemoryPCRF(l, j)≤Rlj

These constraints may then be implemented as:
subject to GWvMemory{(l, j) in LJ}:
virtualMemoryGW[l, j]=sum{(GW, i) in KI, v in VGW, n in N} X[GW, i, v, n, l, j]*Rki[GW, i];
subject to PCRFvMemory{(l, j) in LJ}:
virtualMemoryPCRF[l, j]=sum{(PCRF, i) in KI, v in VPCRF, n in N} X[PCRF, i, v, n, l, j]*Rki[PCRF, i];
subject to virtualMemory{(l, j) in LJ}:
virtualMemoryGW[l, j]+virtualMemoryPCRF[l, j]<=Rlj;

This implementation—disaggregating the allocations by type of VNF 102—like the disaggregation for the vCPU 108a allocations, may have the advantage of the same computational efficiencies over an implementation that does not use such disaggregation, such as:
subject to virtualMemory{(l, j) in LJ}:
sum{(k, i) in KI, v in V, n in N} X[k, i, v, n, l, j]*Rki[k, i]<=Rlj;

As another example, constraints to ensure that only NICs 108c that actually exists within each server 112 j of chassis 110 is allocated may be represented by the equations:

$$virtualNICgw(l, j) = \sum_{i \in I} \sum_{v \in VGW} \sum_{n \in N} X(GW, i, v, n, l, j) \times Eki(GW, i)$$

$$virtualNICpcrf(l, j) = \sum_{i \in I} \sum_{v \in VPCRF} \sum_{n \in N} X(PCRF, i, v, n, l, j) \times Eki(PCRF, i)$$

And the total restriction on allocated NICs 108c may be represented as:

virtualNICgw(l, j)+virtualNICpcrf(l, j)≤Elj

These constraints may then be implemented as:
subject to GWvNIC {(l, j) in LJ}:
virtualNICgw[l, j]=sum{(GW, i) in KI, v in VGW, n in N} X[GW, i, v, n, l, j]*Eki[GW, i];
subject to PCRFvNIC {(l, j) in LJ}:
virtualNICpcrf[l, j]=sum{(PCRF, i) in KI, v in VPCRF, n in N} X[PCRF, i, v, n, l, j]*Eki[PCRF, i];
subject to virtualNIC {(l, j) in LJ}:
virtualNICgw[l, j]+virtualNICpcrf[l, j]<=Elj;

This implementation—disaggregating the allocations by type of VNF 102—like the disaggregation for the vCPU 108a allocations, may have the advantage of the same computational efficiencies over an implementation that does not use such disaggregation, such as:
subject to virtualNIC {(l, j) in LJ}:
sum{(k, i) in KI, v in V, n in N} X[k, i, v, n, l, j]*Eki[k, i]<=Elj;

However, depending upon resource demands of the computer system calculating the values and the relative sizes of the search trees under different implementations of these calculations, it may advantageous or preferable to implemented the simplified, cumulative calculation in lieu of the disaggregated calculations for certain variables. Additionally or alternatively, the disaggregation may be conducted based on other factors besides those contained herein. For example, while the example above illustrates breaking out equations for each type of VNF 102, certain implementations may disaggregate into subgroups of K (e.g., such that each disaggregation actually accounts for more than one type, but less than all types of VNFs 102). Additionally or alternatively, disaggregation may be conducted based on any other factors as appropriate, such as type of VM 104, type of VNF 102, type of chassis 110, type of server 112, or any combination thereof. For example, the above-drafted implementations are drafted using the assumption that each server 112 within each chassis 110 has the same capacity of vCPU 108a, memory 108b, and NIC 108c (variables Clj, Rlj, and Elj, respectively). However, certain implementations may use varying types and sizes of servers 112 or chassis 110, which may require or improve accuracy by implementing multiple variables Clj, Rlj, and Elj to account for the variances among the hardware platform 104. Thus, it may be that implementing these calculations could also be disaggregated based on these or other factors.

Another constraint may require that to assign an instance n of type k of VNF 102 to a particular server 112 of a particular chassis 110, instance n must be used. Thus, for a given server 112 and chassis 110, the sum of the number of VMs 104 of type i, VNFs 102 of type k, must be at least as large as the required amount. The required amount may be represented by the modularity constraint M(k, i), discussed above. This constraint may take advantage of binary variable Y, as discussed above. Mathematically, this constraint may be represented as $$\sum_{ij \in LJ} \sum_{v \in V} X(k, i, v, n, l, j) \geq Y(k, n) \times M(k, i)$$

This constraint may be implemented as:
subject to ifSelectedAssigned{(k,i) in KI, n in N}:
sum{(l, j) in LJ, v in V} X[k, i, v, n, l, j]>=Y[k, n]*M[k, i];

In addition to constraints, affinity and anti-affinity rules may also be consisted in the integer programming problem. For example, an exemplary anti-affinity rule may require that MCM VMs 104a must be on a different server 112. That is, for each instance i of VNF 102 of type GW, at most one MCM VM 104a may be implemented on server 112 j. Mathematically, this may be represented by:

$$\sum_{n \in N} \sum_{v \in VGW} X(GW, MCM, v, n, l, j) \leq 1$$

The above formula may be implemented as:
subject to MCMsOnDiffServers {(l, j) in LJ}:
sum{n in N, v in VGW}X[GW, MCM, v, n, l, j]<=1;

Another anti-affinity rule may prevent assigning VNFs 102 except for gateway VNFs 102a to server 112 on which ASM VM 104b for another gateway VNF 102a is assigned. Additional variables or sets may be used to represent or implement this rule. For example, variables ii may be a member of I, vv may be a member of V, and nn may be a member of N. As another example, a set IPCRF may include only those VMs 104 implemented for PCRF VNFs 102b, a set VPCRF may include only those VM 104 instances that are implemented for PCRF VNFs 102b, and a set KNoGW may include all VNF types k except for GW. (In our example, with K only including two members: GW and PCRF, KNoGW would contain only PCRF.). Mathematically, this may be represented by:

$$\sum_{k \in KNoGW} \sum_{ii \in IPCRF} \sum_{vv \in VPCRF} \sum_{nn \in N} X(k, ii, vv, nn, l, j) \leq 1 - X(GW, ASM, v, n, l, j)$$

The above formula may be implemented as:
subject to ASMsonSameServerAndNoPCRFVMs {(l, j) in LJ, v in VGW, n in N}:
sum{k in KNoGW, ii in IPCRF, vv in VPCRF, nn in N} X[k, ii, vv, nn, l, j]<=1-X [GW, ASM, v, n, l, j];

Another anti-affinity rule may prevent assigning any other VMs 104 supporting any gateway VNFs 102a (except for ASM VMs 104b supporting gateway VNFs 102a) from being assigned to the same server 112 as any ASM VMs 104b instantiated for a gateway VNF 102a. Additional variables or sets may be used to represent or implement this rule. For example, INoASM may be a set of I that includes types of VMs 104 except for ASM VM 104b. Mathematically, this may be represented by:

$$\sum_{ii \in INoASM} \sum_{vv \in VGW} \sum_{nn \in N} X(GW, ii, vv, nn, l, j) \leq 1 - X(GW, ASM, v, n, l, j)$$

The above formula may be implemented as:
subject to ASMsOnSameServerAndNoGWVMs {(l, j) in LJ, v in VGW, n in N}:
sum{ii in INoASM, vv in VGW, nn in N} X[GW, ii, vv, nn, l, j]<=1-X[GW, ASM, v, n, l, j];

Another anti-affinity rule may prevent assigning a VM 104 of type WSM for a gateway VNF 102a on the same server 112 as any VM 104 of type IOM for a gateway VNF 102a. Mathematically, this may be represented by:

$$X(GW, WSM, v, n, l, j) + X(GW, IOM, vv, nn, l, j) \leq 1$$

The above formula may be implemented as:
subject to WSMNotWithIOM{(l, j) in LJ, n in N, nn in N, v in VGW, vv in VVGW}:
X[GW, WSM, v, n, l, j]+X[GW, IOM, vv, nn, l, j];
where VVGW is a set identical to VGW.

Another anti-affinity rule may prevent assigning a VM 104 of type WSM for a gateway VNF 102a on the same server 112 as any ASM VM 104b for a gateway VNF 102a. Mathematically, this may be represented by:

$$X(GW, WSM, v, n, l, j) + X(GW, ASM, vv, nn, l, j) < 1$$

Figure 2A:
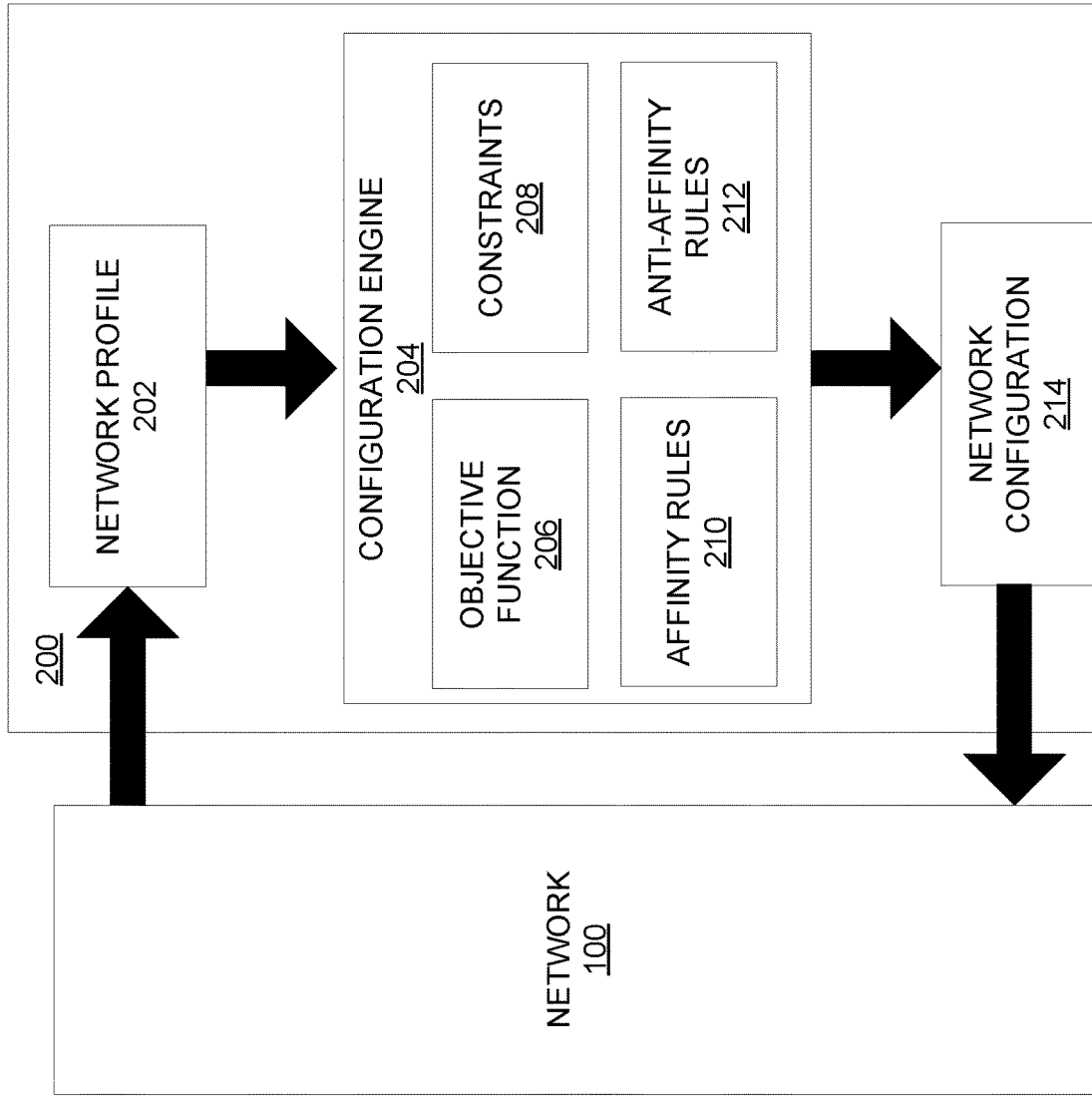
FIG. 2A illustrates a data flow for a system that may be used for configuring a virtualized network platform.
Figure 2B:
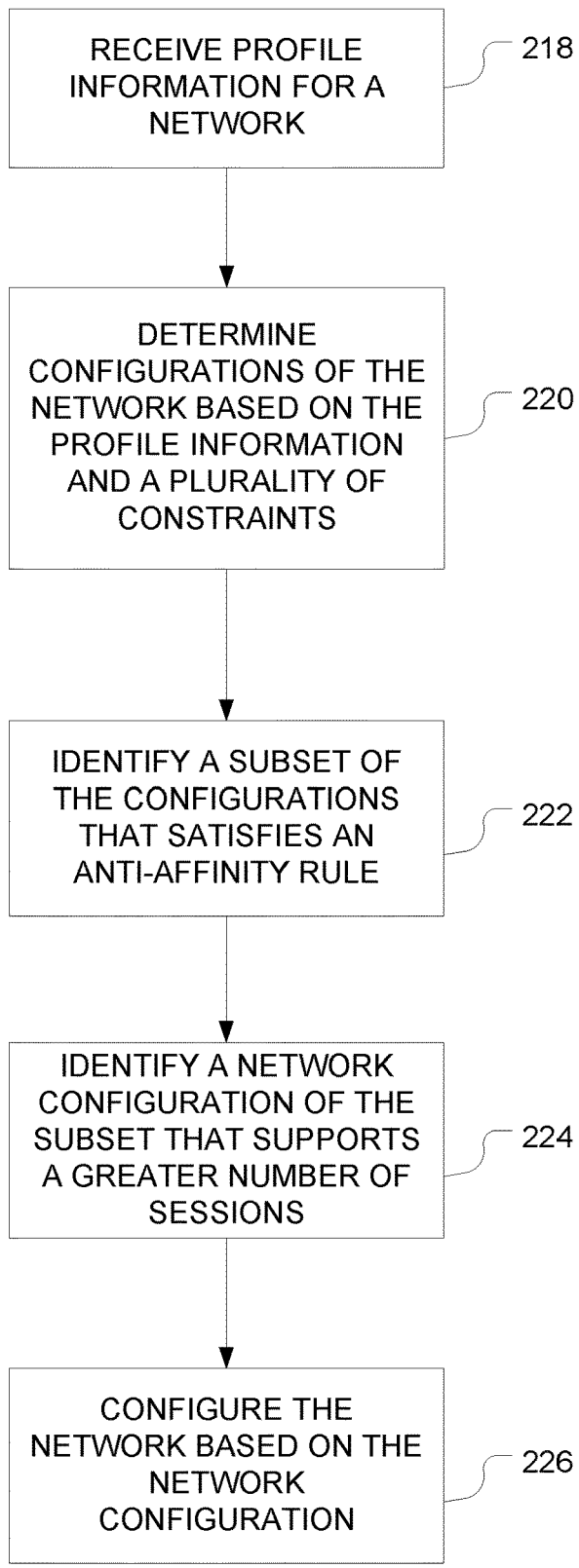
FIG. 2B is a method that may be used for configuring a virtualized network platform.

The above formula may be implemented as:
subject to WSMNotWithASM{(l, j) in LJ, n in N, nn in N, v in VGW, vv in VVGW}:
X[GW, WSM, v, n, l, j]+X[GW, ASM, vv, nn, l, j];

FIG. 2A illustrates a system 200 that may be used to configure network 100, such as by inventorying and assigning resources 108 of hardware platform 106, to one or more VMs 104 or VNFs 102. System 200 may configure network 100 using one or more steps of method 216 illustrated in the flowchart of FIG. 2B.

System 200 may be directly or indirectly communicatively connected to network 100. At step 218, system 200 may receive a network profile 202 from network 100. Network profile 202 may include data indicative of one or more sets or members of sets of data pertaining to the elements of network 100. For example, network profile 202 may indicate the inventory of hardware platform 106, including the number, type, and capacity of chasses 110. For example, network profile 202 may identify the number and type of servers 112 in each chassis 110. Additionally or alternatively, network profile 202 may identify the number and type of resources 108 in each server 112. Network profile 202 may indicate which resources 108, servers 112, or chasses 110 are available, operating properly, assigned to one or more VM 104 or VNF 102, malfunctioning, offline, or the like. Network profile 202 may include (data that may be used to at least partially build) one or more sets (e.g., sets L, J, LJ, I, IPRF, INoASM, K, KNoGW, KNoPCRF, KI, N, V, VGW, VPCRF, VV, VVGW, or the like). Network profile 202 may include (data that may be used to at least partially define) certain parameters that may indicate the capacity or requirements of certain network elements—including virtual components, like VNFs 102 or VMs 104, and hardware platform 106 components, like resources 108, chassis 110, or servers 112. These parameters may include, for example, the capacity for VNF 102 cluster, such as in sessions (e.g., Ck), the vCPU 108a requirement for VM 104 (e.g., Cki) memory 108b requirement for VM 104 (e.g., Rki), NIC 108a requirement for a VM 104 (e.g., Nki), the capacity of vCPUs 108a in server 112 (e.g., Clj), the capacity of memory 108b in server 112 (e.g., Rlj), the capacity of NICs 108c in server 112 (e.g., Nlj) the total vCPUs 108a allocated for gateway VNFs 102a (e.g., virtualCPUgw), the total vCPUs 108a allocated for PCRF VNFs 102b (e.g., virtualCPUpcrf), the total memory 108b allocated for gateway VNFs 102a (e.g., virtualMemoryGW), the total memory 108b allocated for PCRF VNFs 102b (e.g., virtualMemoryPCRF),the total NICs 108c allocated for gateway VNFs 102a (e.g., virtualNICgw), the total NICs 108c allocated for PCRF VNFs 102b (e.g., virtualNICpcrf), or the like.

System 200 may include a configuration engine 204 into which network profile 202 (or at least a portion of data of network profile 202) may be input. Network profile 202 information may be processed by a configuration engine 204 to determine how to configure network 100 that provides a greater number of sessions while still complying with applicable constraints and rules. Configuration engine 204 may include an objective function 206. For example, the objective function may be designed to maximize or increase the total capacity of network 100.

Configuration engine 204 may include one or more constraints 208. The constraints, as discussed above, may restrict or define the total capacity of network 100. For example, constraints 208 may include limitations that the total capacity of network 100 is less than or equal to any of the total capacity of a given type k of VNFs 102. As another example, the total allocated resources 108 of a given type (e.g., vCPUs 108a) cannot be greater than the maximum number of such resources in that server 112 (e.g., virtual-CPU). Another constraint may be that in order to assign an instance of type k of VNF 102 to a chassis 110 and server 112, network 100 needs to be using that instance of type k of VNF 102. Another constraint may be that for a given server 112 and chassis 110, the sum of the number of VMs 104 of type i, VNF 102 type k, must be at least as large as the required amount (which may be determined by M(k, i)).

At step 220, system 200 may determine one or more configurations of network 100 based on the constraints and network profile 202. For example, this may include identifying configurations of network 100 that satisfy one or more of the constraints. This network.

Configuration engine 205 may include one or more affinity rules 210 or anti-affinity rules 212 that may also restrict configuration of network 100. For example, as discussed above, affinity rules may require that certain elements be assigned to the same server 112 or chassis 110, while anti-affinity rules may require that certain other elements be assigned to separate servers 112 or chasses 110.

At step 222, system 200 may identify configurations that satisfy one or more affinity rules or anti-affinity rules. In an aspect, the configurations identified at step 222 may comprise a subset of the configurations identified at step 220. Additionally or alternatively, step 220 and step 222 may be performed simultaneously, so a set of configurations that satisfy both the constraints and the one or more affinity or anti-affinity rules are identified.

At step 224, system 200 may use objective function 206 to identify one or more of the configurations that supports a greater number of sessions. For example, the objective function 206 may select network configuration 214, which satisfies constraints 208, affinity rules 210, and anti-affinity rules 212 and that, within those bounds, provides a greater number of sessions (e.g., maximizing the capacity) set forth in objective function 206.

In an aspect, one or more of steps 220 through 224 may be performed by considering one or more of the formulas disclosed above, or by executing one or more implementations of the integer programming problem disclosed above.

At step 226, network 100 may be configured according to network configuration 214. This may include, for example, assigning one or more VMs 104 or VNFs 102 to one or more servers 112.

Figure 3:
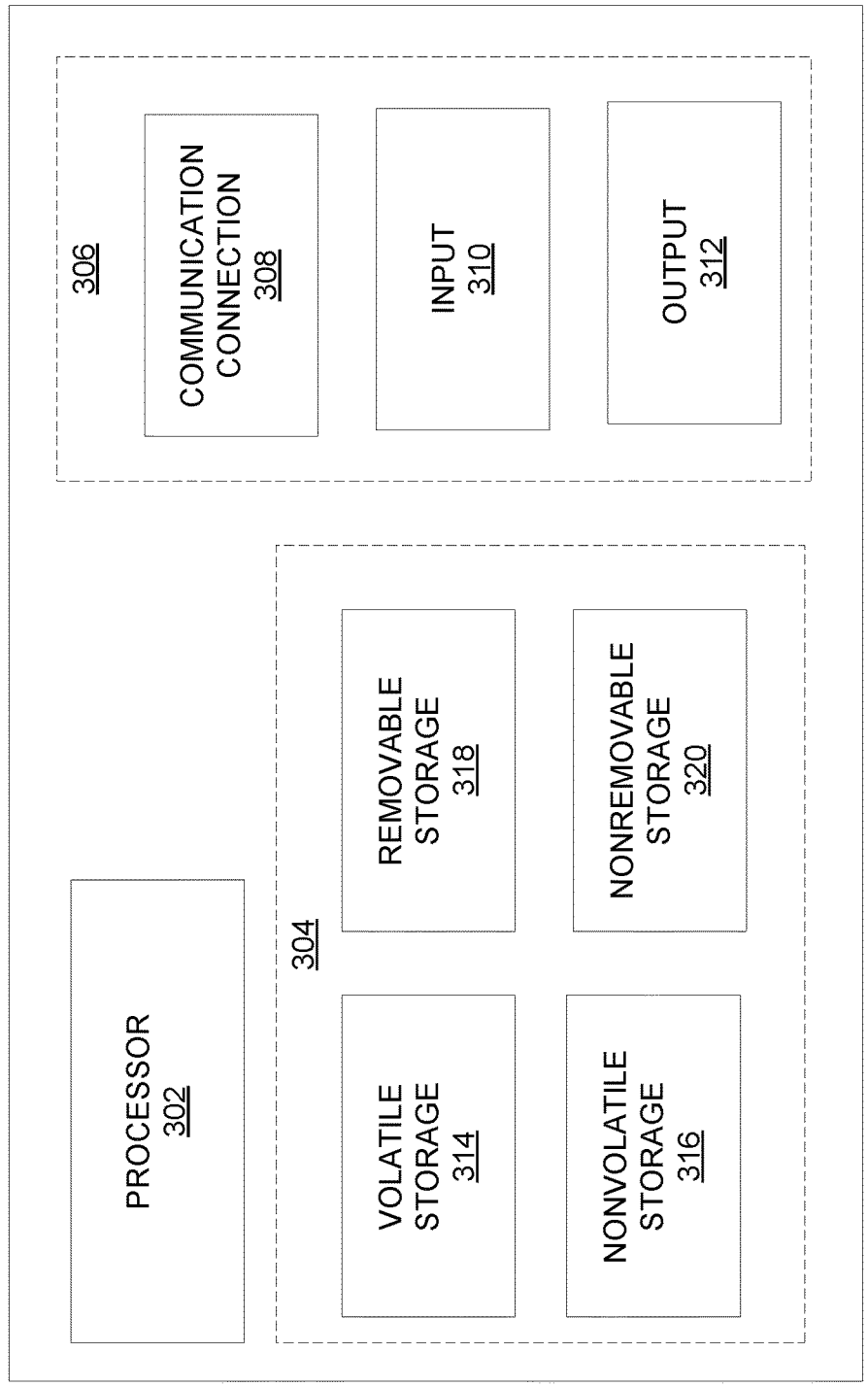
FIG. 3 is a schematic of an exemplary device that may be a component of the system of FIG. 2A.

FIG. 3 is a block diagram of network device 300 that may be connected to or comprise a component of network 100 or system 200. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
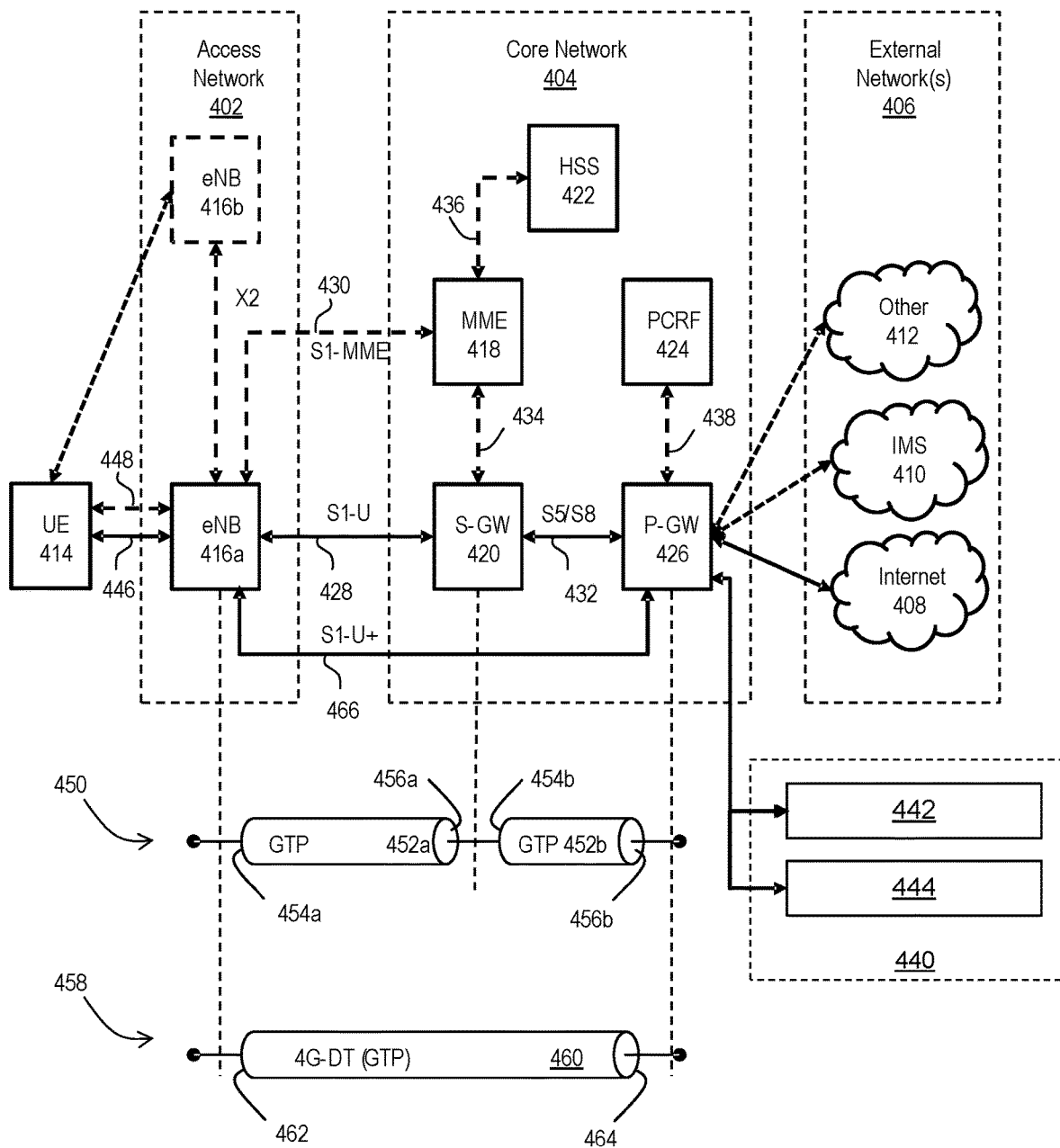
FIG. 4 depicts an exemplary communication system that provide wireless telecommunication services over wireless communication networks that may be modeled using the disclosed systems and methods for configuring a virtualized network platform.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 1B:
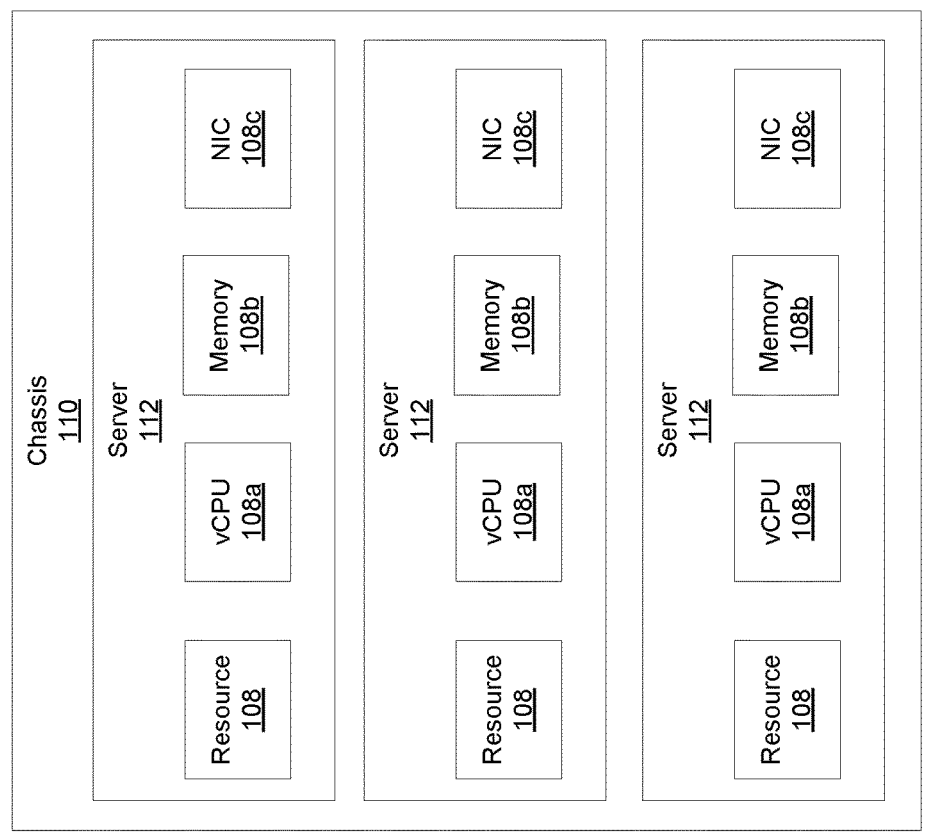
Figure 5:
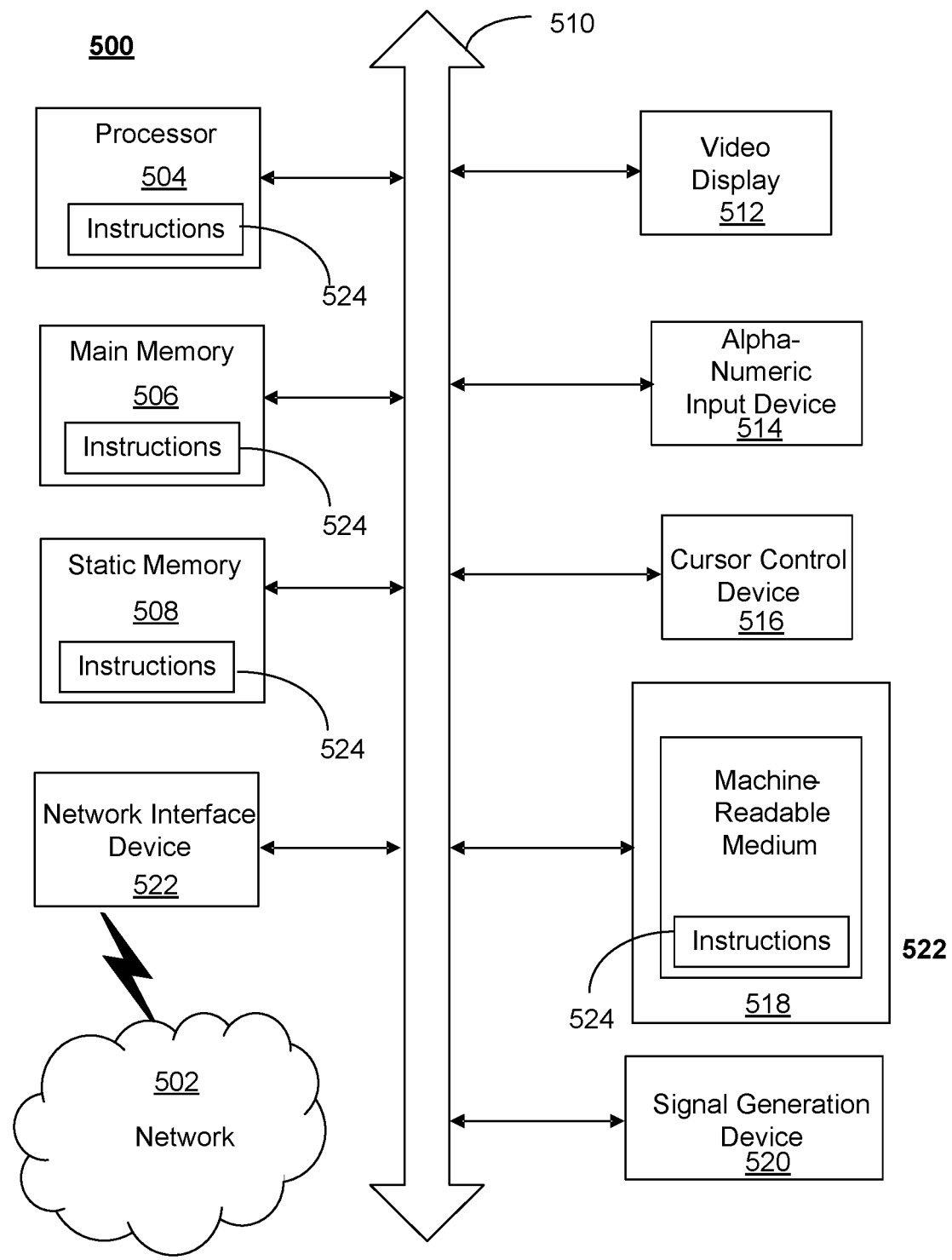
FIG. 5 depicts an exemplary communication system that provide wireless telecommunication services over wireless communication networks that may be modeled using the disclosed systems and methods for configuring a virtualized network platform.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
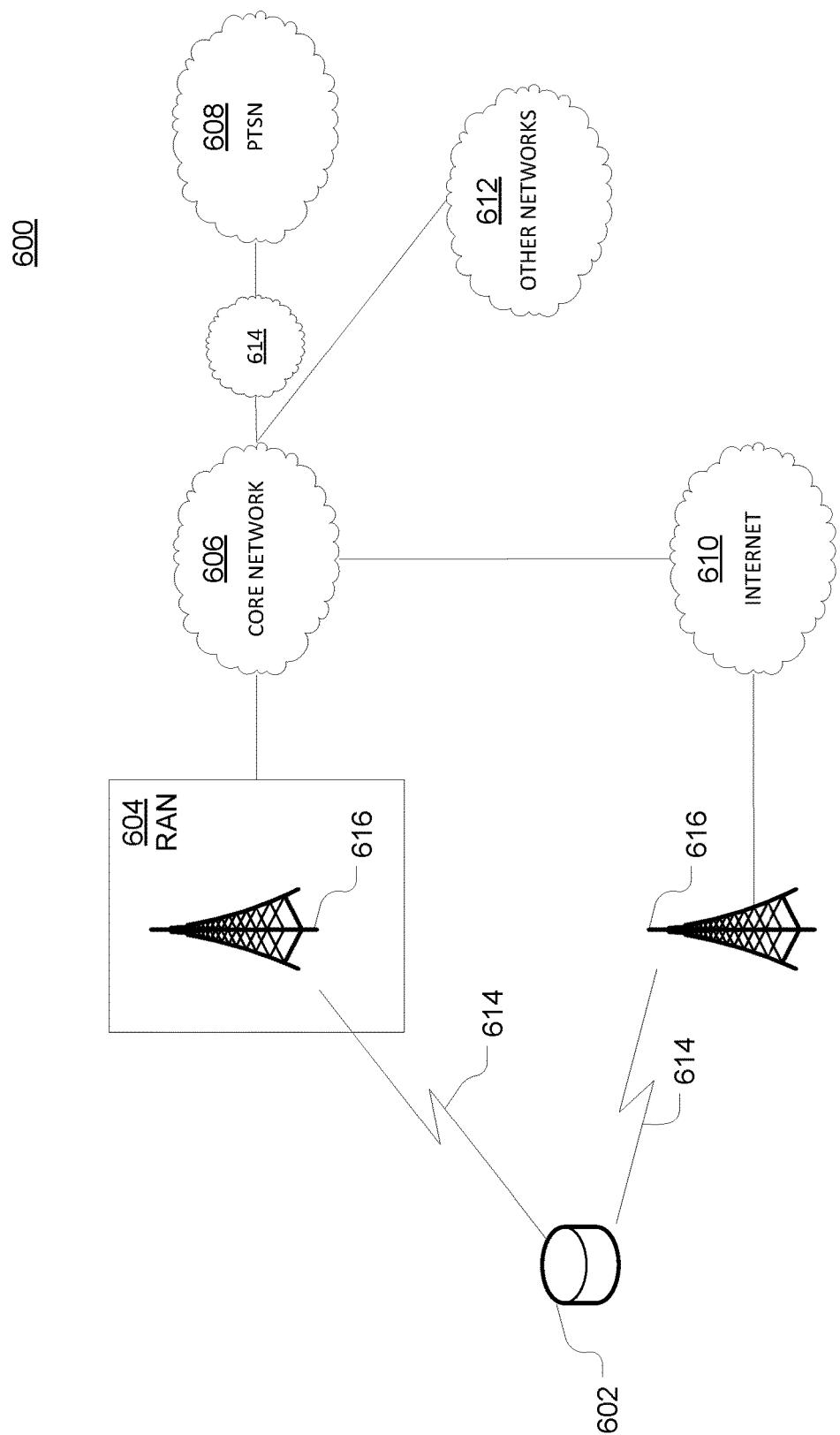
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
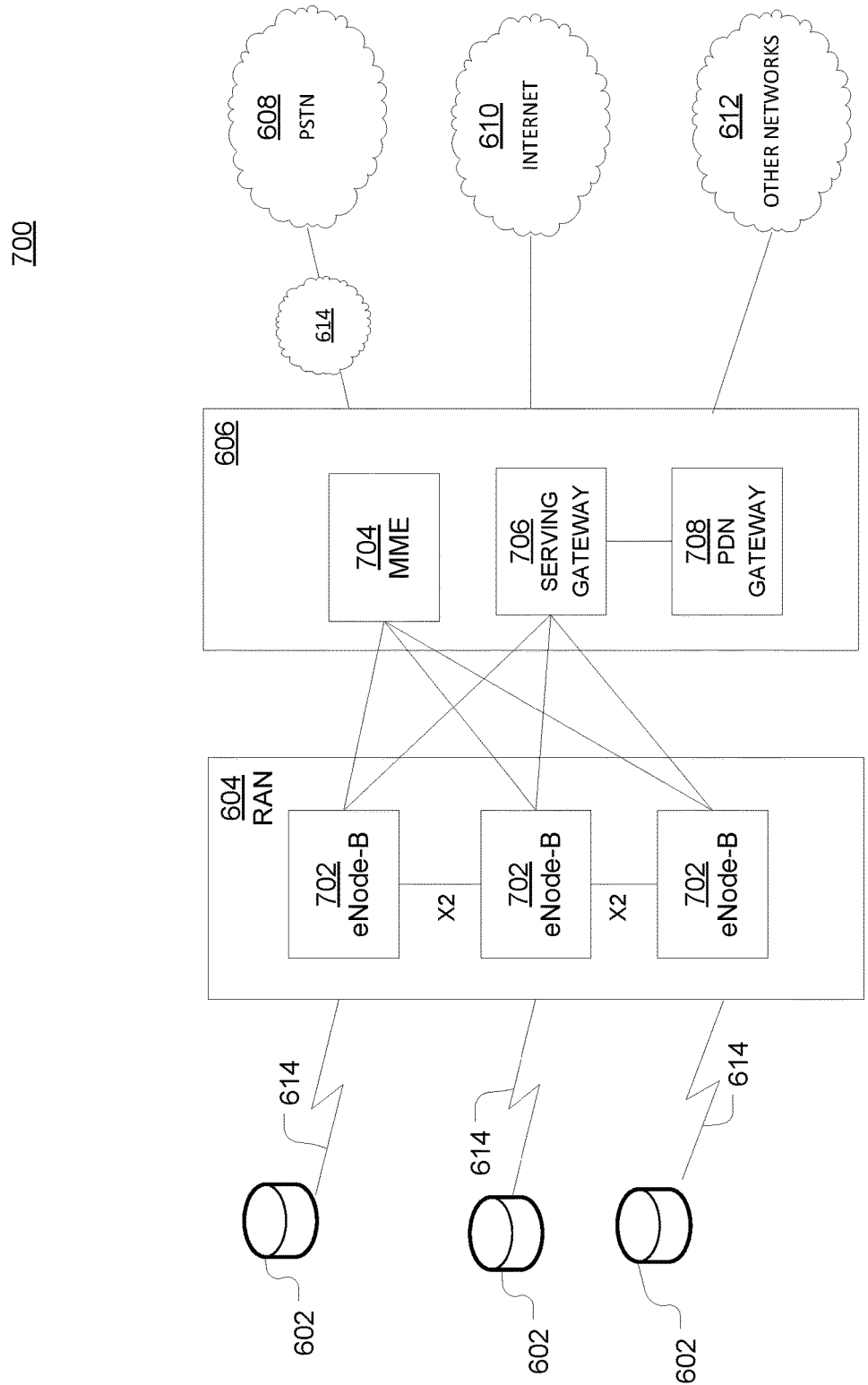
FIG. 7 is an example system diagram of a radio access network and a core network that may be modeled using the disclosed systems and methods for configuring a virtualized network platform.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The invention claimed is:

1. A method comprising:
receiving profile information for a network;
determining constraints associated with at least one of a network session or a hardware capacity of a hardware platform of the network;
determining configurations of the network based on the profile information and the constraints;
identifying a subset of the configurations that satisfies an anti-affinity rule associated with a virtual resource to be used to implement the network session, the subset of the configurations comprising a network configuration and a second network configuration;
determining that the network configuration supports a greater number of sessions than the second network configuration; and
configuring the network based on the network configuration to support the greater number of sessions, wherein the network configuration assigns at least one instantiation of a virtual machine (VM) of a first VM type for at least one instantiation of a virtual network function (VNF) of a first VNF type to at least one server of the hardware platform.

2. The method of claim 1, wherein the constraints comprise:
a virtual computer processing unit (vCPU) allocation for the at least one server;
at least one memory allocation for the at least one server; and
at least one network connectivity allocation for the at least one server.

3. The method of claim 1, wherein the vCPU allocation comprises:
a first vCPU allocation for the first VNF type; and
a second vCPU allocation for a second VNF type.

4. The method of claim 1, wherein identifying the network configuration comprises executing a formulation of an integer programming problem.

5. The method of claim 4, wherein an objective of the integer programming problem is to maximize a number of sessions supported by the network.

6. The method of claim 1, wherein identifying the subset further comprises determining whether the configurations of the subset satisfy an affinity rule associated with a second virtual resource to be used to implement the network session.

7. The method of claim 1, wherein the virtual resource comprises at least one of the VM of the first VM type or the first VNF of the first VNF type.

8. A system comprising:
an input/output communicatively coupled to a network;
a processor; and
memory storing instructions that cause the processor executing the instructions to effectuate operations, the operations comprising:
receiving, via the input/output, profile information for the network;
determining constraints associated with at least one of a network session or a hardware capacity of a hardware platform of the network;
determining configurations of the network based on the profile information and the constraints;
identifying a subset of the configurations that satisfies an anti-affinity rule associated with a virtual resource to be used to implement the network session, the subset comprising a network configuration and a second network configuration;
determining that the network configuration supports a greater number of sessions than the second network configuration; and
configuring the network based on the network configuration to support the greater number of sessions, wherein the network configuration assigns at least one instantiation of a virtual machine (VM) of a first VM type for at least one instantiation of a virtual network function (VNF) of a first VNF type to at least one server of the hardware platform.

9. The system of claim 8, wherein the constraints comprise a first constraint indicative of virtual network function (VNF) types to be used to instantiate the network session.

10. The system of claim 9, wherein the constraints comprise a second constraint indicative of virtual machine (VM) types to be used for one instantiation of a first type of the VNF types.

11. The system of claim 10, wherein the constraints comprise a third constraint indicative of an amount of a first type of the VM types to be used for the one instantiation of the first type of VNF types.

12. The system of claim 10, wherein the anti-affinity rule prevents an instantiation of a first type of the VM types and an instantiation of a second type of the VM types from being implemented on a same server.

13. The system of claim 9, wherein the constraints comprise a second constraint indicative of a session capacity amount for each of the VNF types.

14. The system of claim 13, wherein the greater number of sessions is restricted by a number of instantiations of each of the VNF types and the session capacity amounts of each of the VNF types.

* * * * *